United States Patent
Watanabe

(10) Patent No.: US 7,398,694 B2
(45) Date of Patent: Jul. 15, 2008

(54) PRESSURE SENSOR AND METHOD FOR MANUFACTURING PRESSURE SENSOR

(75) Inventor: Jun Watanabe, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/466,601

(22) Filed: Aug. 23, 2006

(65) Prior Publication Data

US 2007/0062294 A1    Mar. 22, 2007

(30) Foreign Application Priority Data

Aug. 24, 2005    (JP)    .............................. 2005-242245

(51) Int. Cl.
*G01L 9/00*    (2006.01)
(52) U.S. Cl. .......................................... 73/754; 73/756
(58) Field of Classification Search ................... 73/718, 73/724, 721, 754
See application file for complete search history.

(56) References Cited

U.S. PATENT DOCUMENTS 4,766,666 A * 8/1988 Sugiyama et al. .......... 29/621.1
4,771,638 A * 9/1988 Sugiyama et al. ............. 73/721
4,833,920 A * 5/1989 Knecht et al. ................. 73/717

FOREIGN PATENT DOCUMENTS

| JP | 7-174652 | 7/1995 |
| JP | 2001-33328 | 2/2001 |
| JP | 2004-214058 | 7/2004 |

* cited by examiner

*Primary Examiner*—Andre J Allen
(74) *Attorney, Agent, or Firm*—Harness, Dickey & Pierce, P.L.C.

(57) ABSTRACT

The present invention aims at providing a pressure sensor having excellent reliability in sealing a pressure reference chamber and a method for manufacturing the pressure sensor. A movable electrode is formed on an opposing surface side of a diaphragm formed on a pressure-receiving substrate, and an opposing electrode is formed on a region opposing the movable electrode on an opposing substrate. From the movable electrode, a conductive film, and a terminal wire on an inner surface of a through-hole are arranged as conductive wires (lead wires). In addition, from the opposing electrode, a lead wire, a conductive film opposing the lead wire and constructing a contact point, a conductive film and a terminal wire of a castellation are arranged as conductive wires. The pressure-receiving substrate and the opposing substrate are anodically bonded together via the conductive films and, and a specific region including the opposing surface side of the diaphragm is sealed.

8 Claims, 7 Drawing Sheets

PRESSURE SENSOR AND METHOD FOR MANUFACTURING PRESSURE SENSOR

FIELD

The present invention relates to a pressure sensor and a method for manufacturing the same.

BACKGROUND

Conventionally, as a pressure sensor detecting pressure from the amount of deformation of a diaphragm, there is a pressure sensor as disclosed in Patent Document 1. The pressure sensor according to the document has a structure in which a silicon substrate having the diaphragm functioning as a movable electrode and a glass substrate are bonded together and thereby a surface side of the diaphragm is sealed as a pressure reference chamber.

The diaphragm flexes or deforms due to the reflection of a pressure difference between an external pressure and a reference pressure in the pressure reference chamber under a use environment, whereby the diaphragm is in a state of contacting with a dielectric layer on the glass substrate. Under the dielectric layer of the glass substrate is formed an opposing electrode, so that a function as the pressure sensor is performed by detecting the contact area change dependent on the external pressure as a change of interelectrode capacitance. The pressure sensor having such a structure is called a touch-mode capacitive type pressure sensor and has high detectivity and high-voltage tolerance.

Patent Document 1 Japanese Unexamined Patent Application Publication No. 2002-214058

In the above-described pressure sensor, bonding of the silicon substrate and the glass substrate can be performed by anodic bonding. Compared with bonding using a bonding material (such as a wax material), the anodic bonding is suitable to appropriately adjust the reference pressure in the pressure reference chamber because it is not accompanied by generation of gas, as well as it is a method suitable to exactly define a gap between the movable electrode and the opposing electrode (dielectric layer).

However, anodic bonding is a technique requiring high flatness of bonded surfaces and has a problem that it is difficult to obtain a good bonding strength when the flatness is insufficient. Nevertheless, in the structure of the above-described pressure sensor, since a conductive wire for capacitance detection is led out so as to traverse a bonded region from the pressure reference chamber, a level difference equivalent to a film thickness of the conductive wire is produced on the bonded surfaces. Thus, it is difficult to perform a reliable sealing of the pressure reference chamber by anodic bonding.

SUMMARY

The present invention has been made to solve the above problems and aims at providing a pressure sensor having excellent reliability in sealing of a pressure reference chamber and a method for manufacturing the pressure sensor.

The present invention is a pressure sensor comprising that a substrate having a movable electrode formed on a diaphragm and a substrate having an opposing electrode opposing the movable electrode are bonded together at respective opposing surfaces via a conductive film. The pressure sensor is characterized in that the conductive film comprises a conductive wire from the movable electrode or the opposing electrode and is formed in a pattern capable of sealing a predetermined region on the opposing surface side of the diaphragm as a pressure reference chamber.

According to the pressure sensor of the invention, the conductive film plays a role as the conductive wire (lead wire) from the movable electrode or the opposing electrode, as well as it plays a roll as a sealing member for sealing the pressure reference chamber. Therefore, it is unnecessary to arrange another lead wire from the electrode so as to traverse the bonded region, thereby ensuring sealing of the pressure reference chamber at the bonded surfaces without any level difference.

Furthermore, preferably, the pressure sensor is characterized in that at least a part of the conductive film is formed facing an outer edge of the one substrate.

According to the pressure sensor of the invention, the conductive film exposed facing the outer edge of the substrate can be used as an output terminal of the electrode.

Furthermore, preferably, the pressure sensor is characterized in that at least a part of the conductive film is formed facing a through-hole formed in the one substrate.

According to the pressure sensor of the invention, the conductive film exposed facing an opening portion of the through-hole can be used as an output terminal of the electrode.

Furthermore, preferably, the pressure sensor comprising that a lead wire extended out from the movable electrode or the opposing electrode is opposing a part of the conductive film to construct a contact point is characterized in that a thin-wall portion is formed at a site of the contact point on the one substrate.

In the pressure sensor of the invention, due to spring characteristics of the thin-wall portion, the contact point is formed that has excellent compliance with thicknesses of the lead wire and the conductive film. Thus, a reliable electrical connection can be made while ensuring the flatness of the bonded surfaces (contacting surfaces) of the substrates.

Furthermore, preferably, the pressure sensor is characterized in that a crystal plate is used as the substrate having the diaphragm.

Furthermore, preferably, it is characterized in that a crystal plate cut out by AT cut is used as the substrate having the diaphragm.

According to the pressure sensor of the invention, since the diaphragm is formed of a crystal having a small hysteresis in mechanical deformation, it has a good stability of detection characteristics. In addition, since piezoelectric resonance characteristics thereof can be monitored when forming the diaphragm, processing accuracy for shapes and dimensions associated with deformation characteristics thereof can be enhanced. Preferably using the crystal plate cut out by AT cut can enhance processing accuracy for a thickness of the diaphragm that sensitively affects the deformation characteristics.

The present invention is a method for manufacturing a pressure sensor comprising that a substrate having a movable electrode formed on a diaphragm and a substrate having an opposing electrode opposing the movable electrode are bonded together at respective opposing surfaces via a conductive film, and the method is characterized by having a conductive-film formation step for forming a conductive film comprising a lead wire from the movable electrode or the opposing electrode on the opposing surface of the one substrate in a pattern capable of sealing a predetermined region on the opposing surface side of the diaphragm as a pressure reference chamber and a bonding step for anodically bonding the conductive film and the opposing surface of the other substrate.

In addition, the present invention relates to a pressure sensor comprising that a pressure-receiving substrate having a diaphragm and comprised of a crystal plate and an opposing substrate opposing the pressure-receiving substrate are bonded together at respective opposing surfaces. The pressure sensor is characterized by being formed in a pattern capable of sealing a predetermined region on the opposing surface side of the diaphragm as a pressure reference chamber.

In addition, it relates to the pressure sensor characterized in that a crystal plate cut out by AT cut is used as the pressure-receiving substrate.

According to the method for manufacturing the pressure sensor of the invention, since the conductive film plays a role as the conductive wire (lead wire) from the movable electrode or the opposing electrode, as well as it plays a role as a sealing member for sealing the pressure reference chamber by bonding the substrates, it is unnecessary to arrange another lead wire from the electrode so as to traverse the bonded region, so that sealing of the pressure reference chamber by the bonded surfaces without any level difference can be reliably performed by anodic bonding.

DETAILED DESCRIPTION

Figure 1:
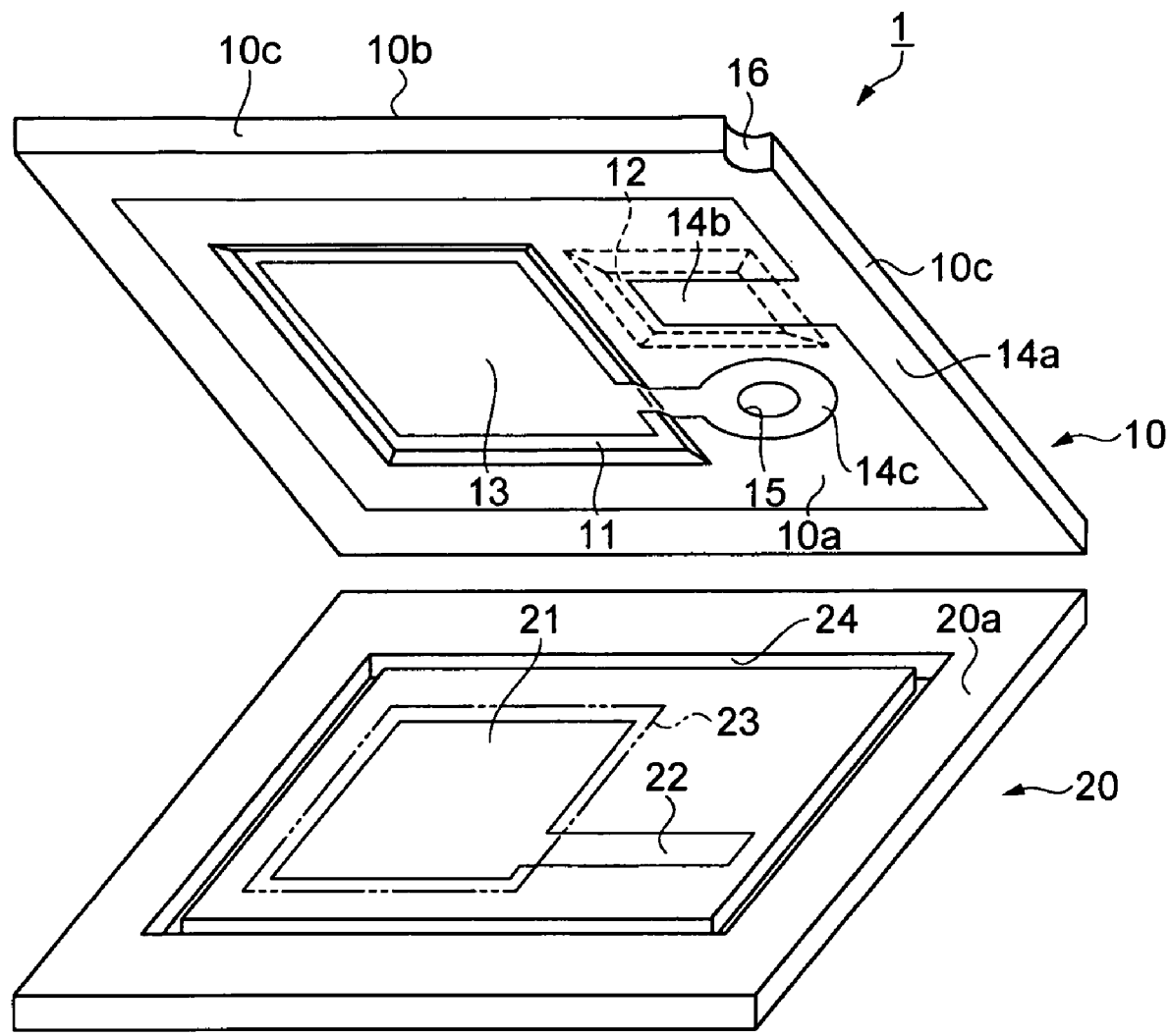
FIG. 1 is an exploded perspective view showing an inner structure of a pressure sensor.

Hereinafter, preferable embodiments of the present invention will be described in detail with reference to the accompanying drawings.

Furthermore, the embodiments described below are preferable concrete examples of the invention, and hence a variety of technically preferable limitations is added thereto. However, a scope of the invention is not limited to those embodiments as long as there is particularly no description limiting the present invention in the following explanation. In addition, in the drawings referred to in the explanation below, in order to make each layer and each member into the size of an extent that can be recognized on the drawings, reduced scales of them are shown differently from actual scales thereof.

First, referring to FIG. 1, FIG. 2, FIG. 3, FIG. 4 and FIG. 5, a description will be given of a structure of a pressure sensor according to the present invention.

Figure 2:
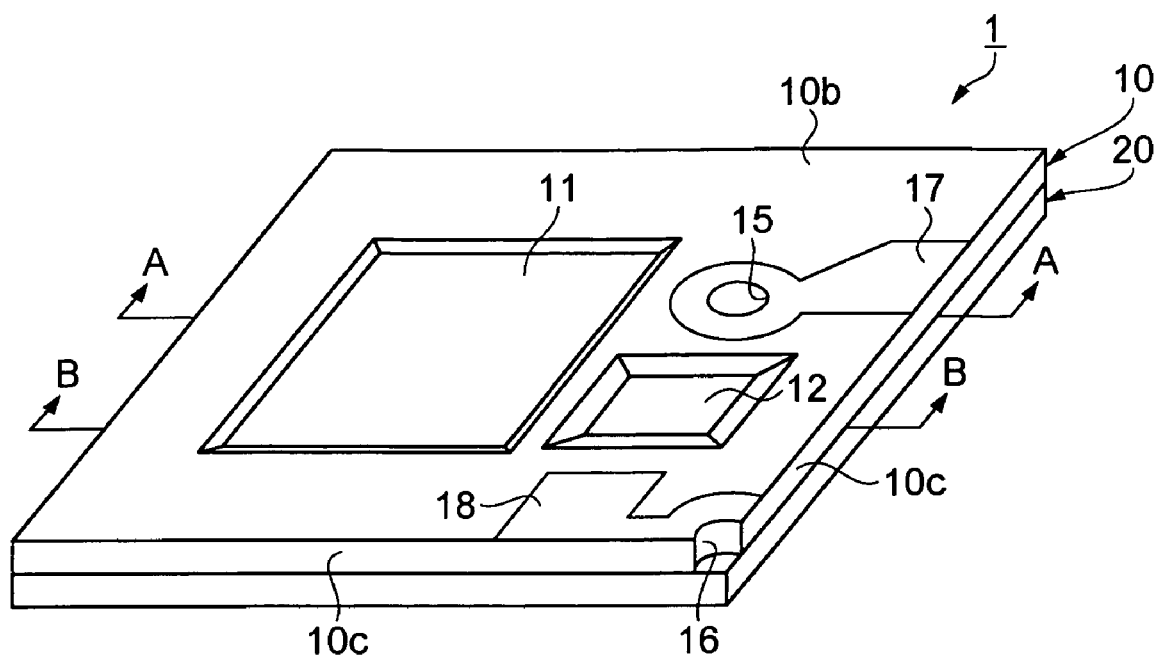
FIG. 2 is a perspective view showing an exterior structure of the pressure sensor.
Figure 3:
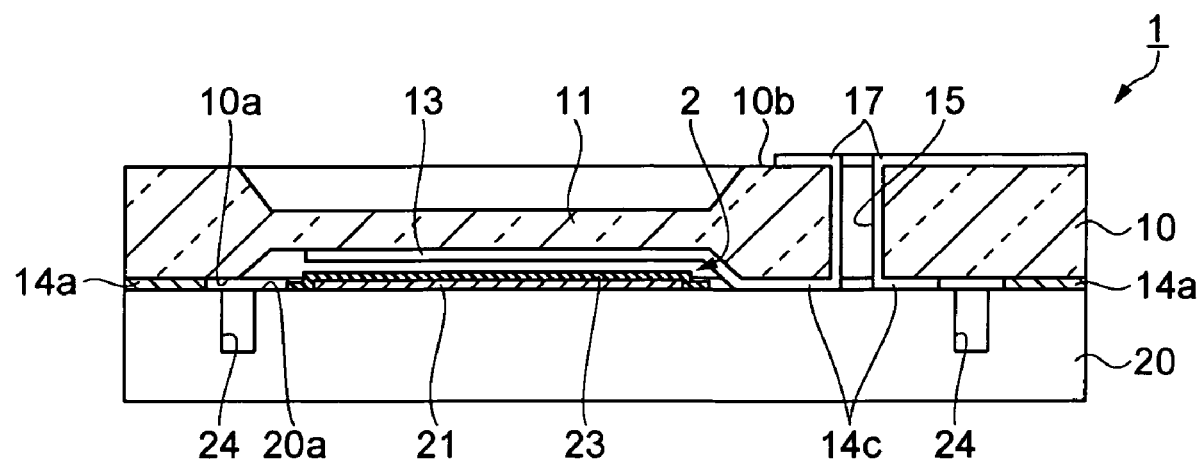
FIG. 3 is an A-A sectional view of FIG. 2.
Figure 4:
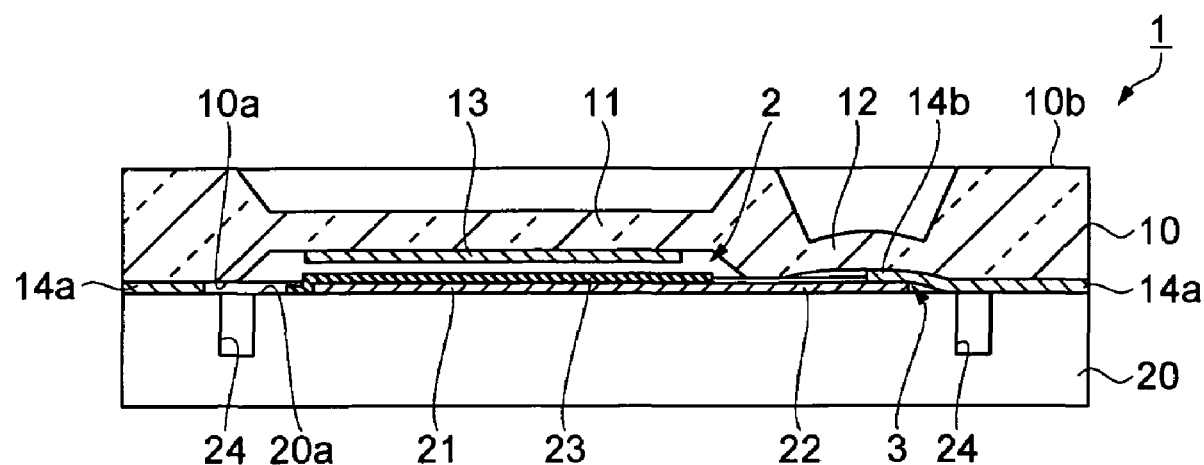
FIG. 4 is a B-B sectional view of FIG. 2.
Figure 5:
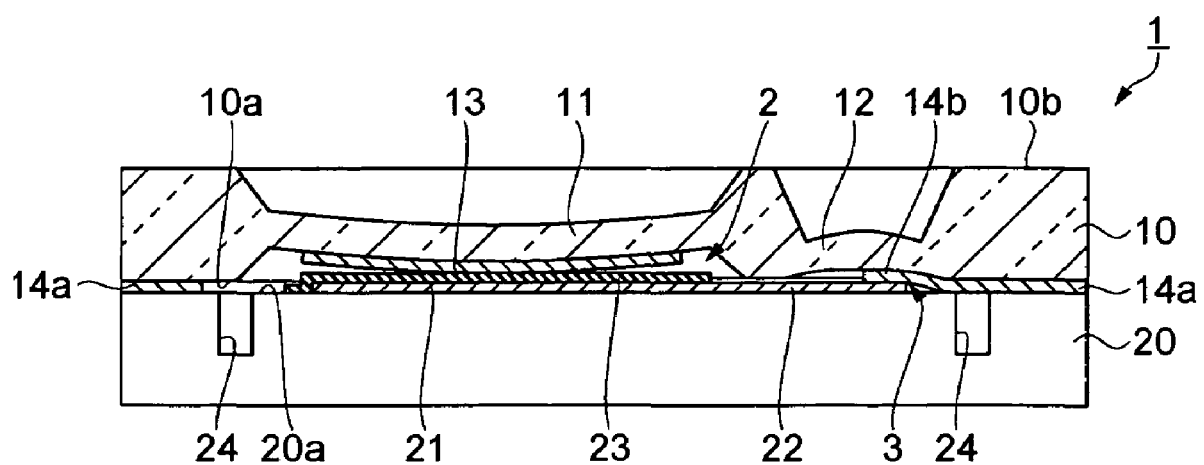
FIG. 5 is the B-B sectional view of FIG. 2 under a use environment.

FIG. 1 is an exploded perspective view showing an inner structure of the pressure sensor. FIG. 2 is a perspective view showing an exterior structure of the pressure sensor. FIG. 3 is an A-A sectional view of FIG. 2. FIG. 4 is a B-B sectional view of FIG. 2. FIG. 5 is the B-B sectional view of FIG. 2 under a use environment.

In FIG. 1 to FIG. 4, a pressure sensor 1 is constructed by bonding a pressure-receiving substrate 1 having a diaphragm 11 and an opposing substrate 20 at an opposing surface 10a and an opposing surface 20a, respectively. In this embodiment, a crystal plate cut out by AT cut is used as the pressure-receiving substrate 10 and a glass containing alkali necessary for anodic bonding and having a linear expansion coefficient approximated to that of the pressure-receiving substrate is used as the opposing substrate 20.

On the pressure-receiving substrate 10, the diaphragm 11 in which a predetermined region is thin-walled is formed in a roughly square shape in a state in which surfaces thereof are recessed from the opposing surface 10a and an outer surface 10b. In addition, on the pressure-receiving substrate 10 is formed a thin-walled portion 12 slightly smaller than the diaphragm 11 and thin-walled in a state in which a surface thereof is recessed from the opposing surface 10a.

On the opposing surface 10a side of the pressure-receiving substrate 10 are disposed a movable electrode 13 and conductive films 14a, 14b and 14c formed by patterning with aluminum or the like. Here, the movable electrode 13 is formed on the diaphragm 11. The conductive film 14a is formed along an outer edge 10c of the pressure-receiving substrate 10. The conductive film 14b extends out from the conductive film 14a to be formed on the thin-walled portion 12. The conductive film 14c extends out from the movable electrode 13 to be formed around an opening of a through-hole 15 formed in the pressure-receiving substrate 10.

On the opposing surface 20a of the opposing substrate 20 are disposed an opposing electrode 21 and a lead wire 22 formed by patterning with aluminum or the like and a dielectric film 23 formed by patterning with $SiO_2$ or the like. The opposing electrode 21 is formed so as to oppose the movable electrode 13 on the pressure-receiving substrate 10 side, and the dielectric film 23 is formed so as to cover the opposing electrode 21. In addition, the lead wire 22 extends out from the opposing electrode 21 to be formed so as to oppose the conductive film 14b on the pressure-receiving substrate 10 side.

The conductive films 14a and 14c on the pressure-receiving substrate 10 are anodically bonded to the opposing surface 20a of the opposing substrate 20, whereby a predetermined region on the opposing surface 20a side of the diaphragm 11 is in a state of being sealed as a pressure reference chamber 2. Here, an inner pressure of the pressure reference chamber 2 is being maintained at a predetermined reference pressure (in a depressurized state, in general).

On the opposing surface 20a of the opposing substrate 20 is formed a slit 24 along a region bonded to the conductive film 14a. The slit 24 is disposed to alleviate deformation, since the anodic bonding of both substrates 10 and 20 causes in-plane deformation dependent on a difference in thermal expansion coefficients between the substrates. That is, a periphery of the slit 24 in the opposing substrate 20 functions as an easy-to-deform portion, which is easy to deform, and in-plane deformation on the opposing substrate 20 side is absorbed by deformation of the deformation-easy portion. Furthermore, when the slit 24 is formed in the opposing surface 20a as in the embodiment, compliance with the pressure-receiving substrate 10 at the bonded surfaces becomes better due to the slit 24. Thus, in-plane deformation on the pressure-receiving substrate 10 side is also alleviated.

In addition, in this embodiment, the slit 24 is formed inside the pressure reference chamber 2 and thereby a capacity of the pressure reference chamber 2 is substantially large. For this reason, stability of a reference pressure with respect to leakage and the like becomes better.

The lead wire 22 and the conductive film 14b mechanically come in contact in a state in which the substrates 10 and 20 are bonded together to construct a contact point 3. At this time, at the contact point 3, due to spring characteristics of the thin-walled portion 12 formed on the pressure-receiving substrate 10 side, reliable electric connection is made while showing compliance suitable to thicknesses of the lead wire 22 and the conductive film 14b. In this way, flatness is achieved on the bonded surfaces (contacting surfaces) of the substrates 10 and 20, whereby strong bonding of the substrates and reliable sealing of the pressure reference chamber 2 can be performed.

Referring back to FIG. 1 to FIG. 4, on the outer surface 10b side of the pressure-receiving substrate 10 are disposed terminal wires 17 and 18 formed by patterning with aluminum or the like. The terminal wire 17 is formed continuously up to an inner surface of the through-hole 15 to be connected to the conductive film 14c, whereas the terminal wire 18 is formed continuously up to a castellation 16 disposed at a corner of the pressure-receiving substrate 10 to be connected to the conductive film 14a. In this way, the terminal wire 17 functions as an output terminal of the movable electrode 13 via the conductive film 14c and the terminal wire 18 functions as an output terminal of the opposing electrode 21 via the conductive films 14a and 14b, the contact point 3 and the lead wire 22.

The movable electrode 13 and the dielectric film 23 are opposing via only a small gap as shown in FIG. 3 and FIG. 4 in a state in which there is a balance between a reference pressure and an external pressure. Then, when the pressure sensor 1 is put under a use environment (for example, under an atmospheric pressure), as shown in FIG. 5, the diaphragm 11 causes flexibility deformation due to a pressure difference between the reference pressure and the external pressure. Consequently, a contact area of the movable electrode 13 and the dielectric film 23 changes in response to the amount of deformation of the diaphragm 11 dependent on the external pressure. Thus, the external pressure can be detected from a change in interelectrode capacitance coincident with a change in the contact area.

In this embodiment, the pressure-receiving substrate 10 is an insulator and the movable electrode 13 is a metal film formed by patterning on the diaphragm 11. For this reason, compared with a pressure sensor in which the movable electrode is constructed by making an entire silicon substrate conductive as in Patent Literature 1, extra parallel capacitance (with respect to interelectrode capacitance) does not occur between the conductive wires from both electrodes, and there is an excellent sensitivity to a relative capacitance change. In relation to this, in the pressure sensor 1, a small series capacitance will be parasitically generated between the lead wire 22 and the conductive film 14b at the contact point 3. However, it is only a small contribution (1% or less) as compared with the interelectrode capacitance.

In addition, in the embodiment, the crystal plate having a small hysteresis in mechanical deformation is used as the pressure-receiving substrate 10 where the diaphragm 11 is formed. Therefore, the pressure sensor 1 is excellent in stability of deformation characteristics of the diaphragm 11 and eventually of detection characteristics.

Next, referring to FIG. 1 to FIG. 4 and FIG. 6, a description will be given of a method for manufacturing the pressure sensor.

Figure 6:
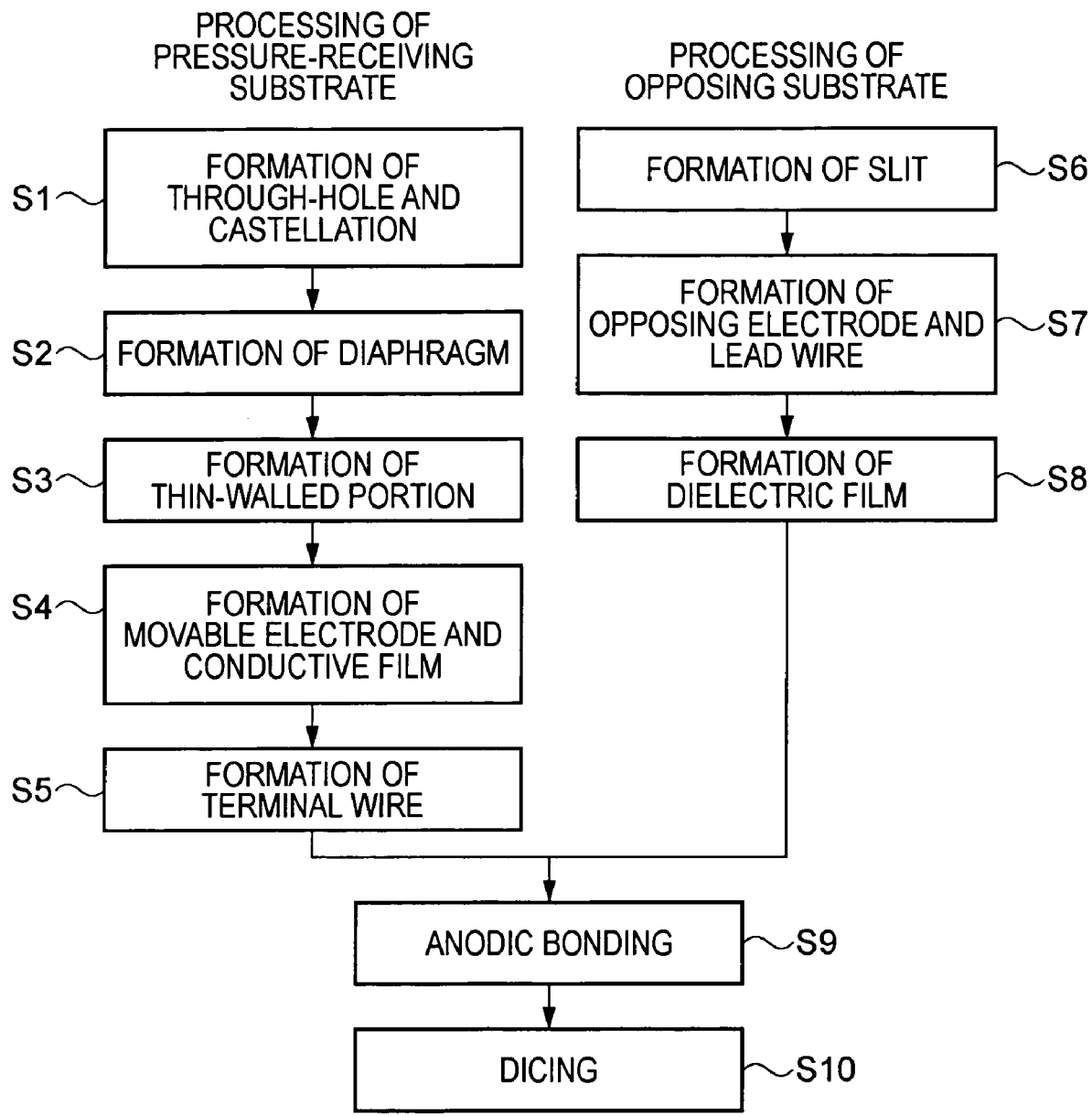
FIG. 6 is a flow chart showing a manufacturing process of the pressure sensor.

FIG. 6 is a flowchart showing a manufacturing process of the pressure sensor.

The pressure sensor 1 is manufactured by respectively performing steps S1 to S5 of FIG. 6 on the pressure-receiving substrate 10 and steps S6 to S8 of FIG. 6 on the opposing substrate 20, bonding together both substrates 10 and 20 by anodic bonding and finally dicing into individual units (step S10 of FIG. 6). Hereinafter, details of each step will be described.

In step S1, on the pressure-receiving substrate 10 are formed the through-hole 15 and the castellation 16 by etching or the like. In addition, before dicing, the castellation 16 has a structure similar to that of the through-hole 15.

In step S2, the diaphragm 11 is formed by performing etching process or the like on both surfaces of the pressure-receiving substrate 10. Shapes and dimensions of the diaphragm 11 are designed so that deformation characteristics appropriate under a use environment can be obtained. The size of a side thereof is, for example, approximately 0.9 mm and the thickness size thereof is, for example, approximately 10 μm. Additionally, a depth of a recess from the opposing surface 10a to the surface of the diaphragm 11 is designed so that a contact area of the movable electrode 13 and the dielectric film 23 falls in an appropriate range under a use environment, which is approximately 6 μm, for example.

Since a thickness size of the diaphragm 11 affects particularly sharply the deformation characteristics, it is necessary to exert high-precision processing control on the thickness size in order to suppress variations in the characteristics. In a thickness-slip vibration piece of AT cut or the like, it is known that there is an inverse relationship between a thickness size and a resonant frequency. Therefore, in this embodiment, accurate measurement of the thickness size is conducted by measuring piezoelectric vibration characteristics of a thickness-slip mode and a thickness-longitudinal mode to adjust sizes between lots and individual units by fine-tuned etching. Use of the crystal plate cut out by AT cut as the pressure-receiving substrate 10 is due to the convenience of measurement of the piezoelectric vibration characteristics.

In step S3, the thin-walled portion 12 is formed by the same procedures as those in step S2. Shapes and dimensions of the thin-walled portion 12 are factors associated with spring characteristics of the contact point 3, and it is thus necessary to perform an appropriate design. Additionally, the thin-walled portion 12 is disposed to enhance the flatnesses of the bonded surfaces (contacting surfaces) of the substrates 10 and 20 as described earlier. However, this is an added requirement for increasing effectiveness of the invention and can be omitted.

In step S4, using a gas-phase method and photolithography or the like, the movable electrode 13 and the conductive films 14a, 14b and 14c are formed on the opposing surface 10a side of the pressure-receiving substrate 10. In other words, the step S4 is a conductive-film formation step of the invention.

In step S5, using a gas-phase method and photolithography or the like, the terminal wires 17 and 18 are formed on the outer surface 10b side of the pressure-receiving substrate 10. In addition, in the step S5, a dummy wire for short-circuiting the terminal wire 17 and the terminal wire 18 through between all individual units on the same substrate is also formed on a region cut off by dicing. This is a consideration taken to supply a common potential to the conductive films 14a, 14b and 14c by a single terminal in a case in which anodic bonding is performed in step S9.

In step S6, using a sand blaster or the like, the slit 24 is formed on the opposing surface 20a side of the opposing substrate 20. For the purpose of alleviating in-plane distortion, the slit 24 may even have a narrow width. However, it is preferable to have a depth size equal to or greater than a certain extent (for example, 40% of a substrate thickness).

Furthermore, the slit 24 is an additional requirement for improving variations in characteristics and the like due to influence of distortion and it can be omitted.

In step S7, using a gas phase method and photolithography or the like, on the opposing surface 20a side of the opposing substrate 20 are formed the opposing electrode 21 and the lead wire 22.

In step S8, using a gas phase method and photolithography or the like, on the opposing surface 20a side of the opposing substrate 20 is formed the dielectric film 23.

In a bonding step S9, while conducting pressure application and thermal processing, the pressure-receiving substrate 10 and the opposing substrate 20 are anodically bonded by using the conductive films 14a and 14c as a positive polarity and the opposing substrate 20 as a negative polarity and applying a high voltage therebetween. The bonding of both substrates 10 and 20 is performed between flat bonded surfaces without any level difference, namely, between surfaces of the conductive films 14a, 14c and the opposing surface 20a. Therefore, a firm bonding strength and a high reliability in sealing of the pressure reference chamber 2 can be obtained. Additionally, the bonding step S9 is performed under the same pressure as a reference pressure, whereby the reference pressure of the pressure reference chamber 2 is defined.

The substrates 10 and 20 try to shrink by an amount dependent on a thermal expansion coefficient of each substrate in a cooling process after the anodic bonding. However, depending on a difference in thermal expansion coefficients between the substrates, in-plane distortion (residual stress) occurs inside both substrates 10 and 20. In the embodiment, the pressure-receiving substrate 10 using crystal tries to shrink more than the opposing substrate 20 using glass. Accordingly, distortion trying to allow extension in a substrate in-plane direction will occur on the pressure-receiving substrate 10, whereas distortion trying to allow shrinkage in the substrate in-plane direction will occur on the opposing substrate 20. The in-plane distortions become a cause bringing about substrate warpage or variations in deformation characteristics of the diaphragm 11, and thus it is preferable to reduce them as much as possible. Therefore, in the embodiment, the slit 24 is formed in the previous step S6, thereby achieving alleviation of such distortions.

Finally, in step S10, the substrate is diced into individual units. In this occasion, the formation region of the dummy wire formed in the step S5 is cut off and a pressure sensor 1 is completed as an individual unit.

MODIFIED EXAMPLE 1

Next, referring to FIG. 7, a modified example 1 of the invention will be described focusing around points different from the above embodiment.

Figure 7:
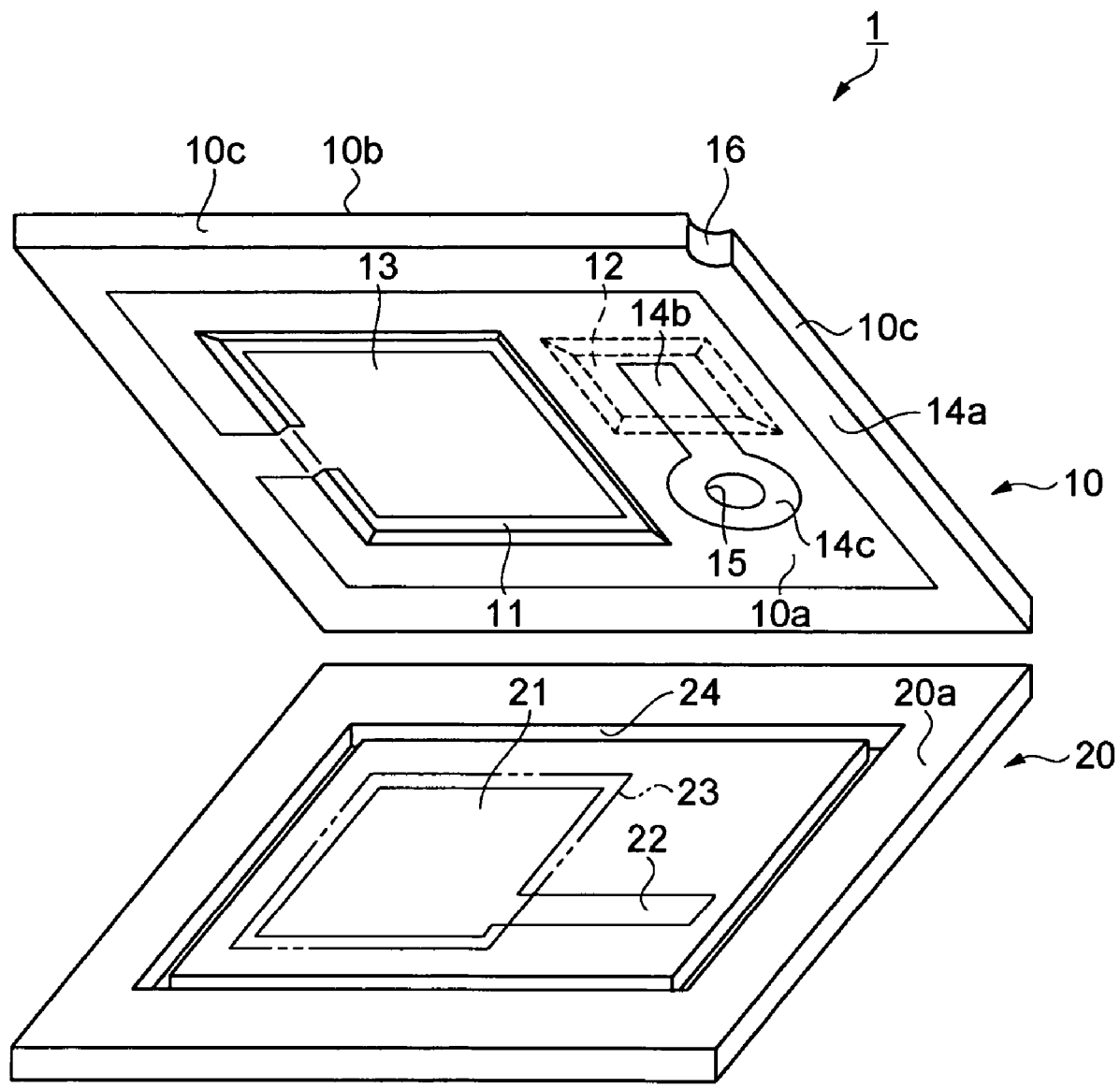
FIG. 7 is an exploded perspective view showing an inner structure of a pressure sensor according to a modified example 1.

FIG. 7 is an exploded perspective view showing an inner structure of a pressure sensor according to the modified example 1.

In the modified example 1, the movable electrode 13 is connected to the conductive film 14a formed along the outer edge 10c, and the terminal wire 18 (see FIG. 2) formed continuously up to the castellation 16 is used as an output terminal thereof. In addition, the opposing electrode 21 uses the terminal wire 17 (see FIG. 2) formed continuously up to the inner surface of the through-hole 15 via the lead wire 22, the conductive film 14b formed opposing the lead wire 22 and the conductive film 14c formed around the opening of the through-hole 15 as an output terminal thereof.

As in the modified example, regarding a conductive wire pathway from the movable electrode or the opposing electrode, free design is possible within a range that does not change the scope of the invention.

MODIFIED EXAMPLE 2

Next, referring to FIG. 8, a modified example 2 of the invention will be described focusing around points different from the above embodiment.

Figure 8:
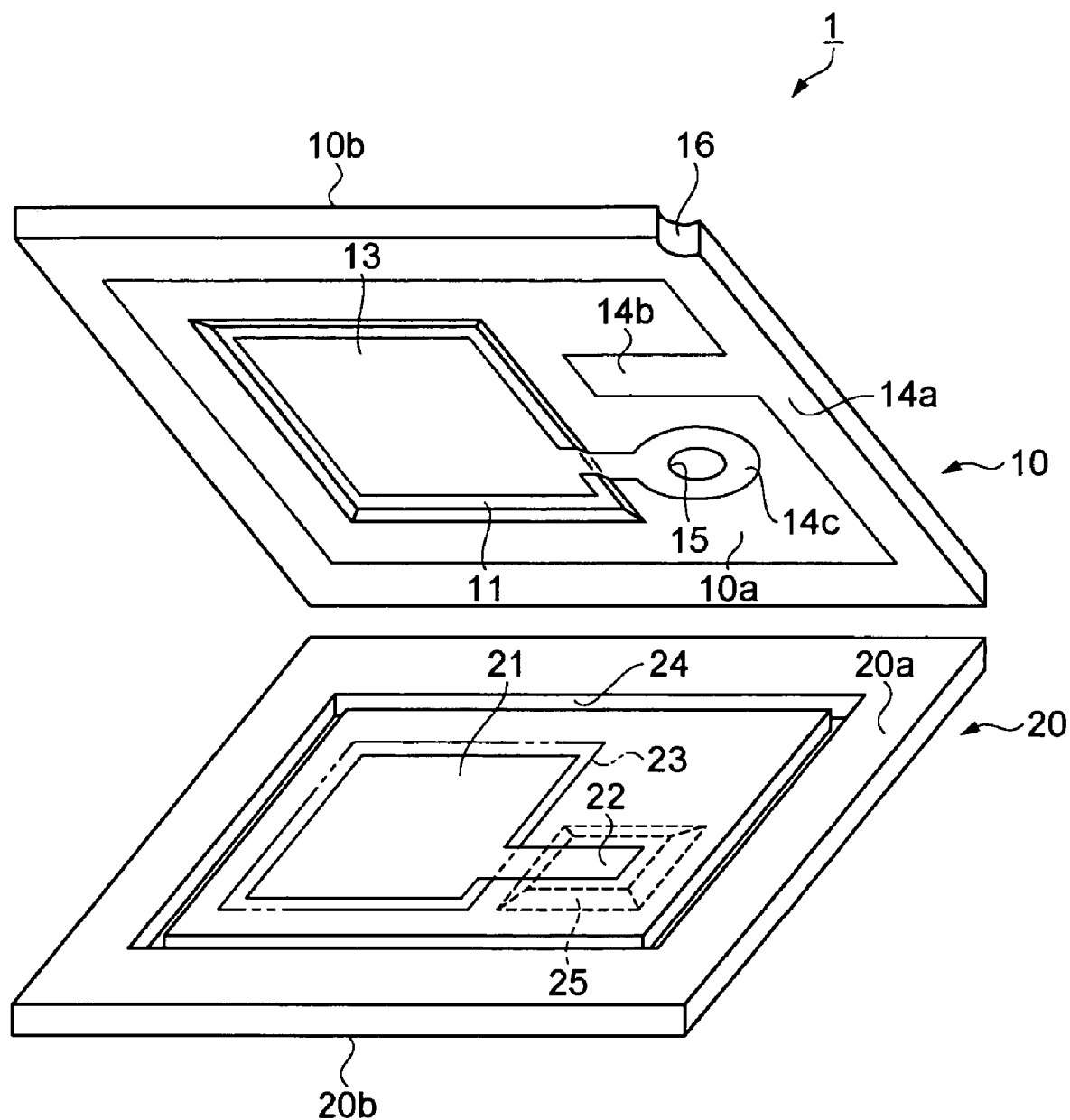
FIG. 8 is an exploded perspective view showing an inner structure of a pressure sensor according to a modified example 2.

FIG. 8 is an exploded perspective view showing an inner structure of a pressure sensor according to the modified example 2.

In the modified example 2, a thin-walled portion 25 is formed at a contact point site of the lead wire 22 on the opposing substrate 20 and the conductive film 14b.

As in the modified example, the thin-walled portion of the invention may be disposed on either the pressure-receiving substrate or the opposing substrate.

MODIFIED EXAMPLE 3

Next, referring to FIG. 9, a modified example 3 of the invention will be described focusing around points different from the above embodiment.

Figure 9:
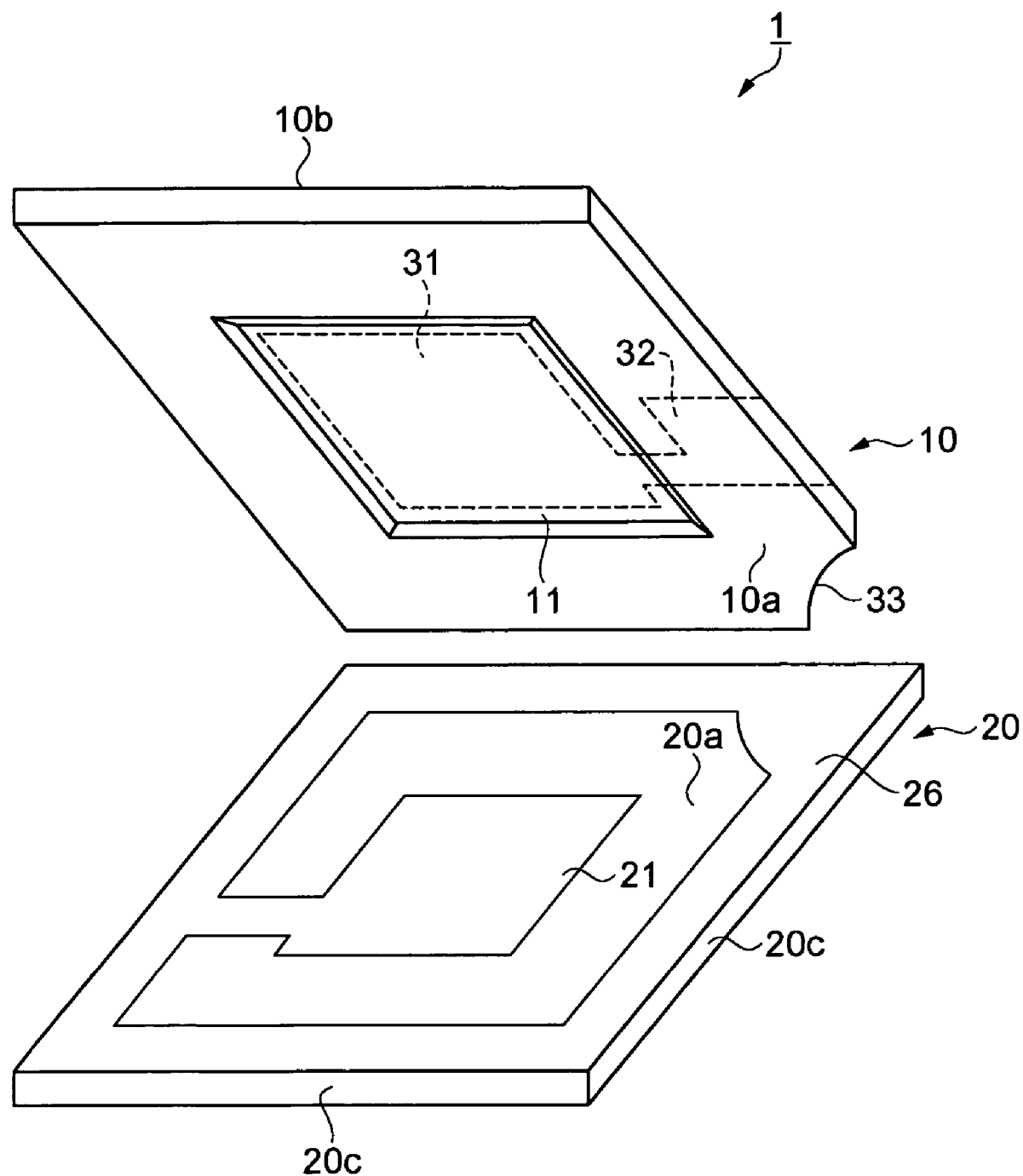
FIG. 9 is an exploded perspective view showing an inner structure of a pressure sensor according to a modified example 3.

FIG. 9 is an exploded perspective view showing an inner structure of a pressure sensor according to the modified example 3.

In the modified example 3, as both the pressure-receiving substrate 10 and the opposing substrate 20, a glass is used that contains alkali necessary for anodic bonding and having a linear expansion coefficient approximated to that of the pressure-receiving substrate. A conductive film 26 is formed integrally with the opposing electrode 21 on the opposing surface 20a of the opposing substrate 20. Additionally, a part of the conductive film 26 is exposed by a cutaway portion 33 disposed at a corner of the pressure-receiving substrate 10, and the exposed part of the conductive film 26 is used as an output terminal of the opposing electrode 21. Furthermore, the movable electrode 31 is formed on the outer surface 10b side of the diaphragm 11, where a touch-mode capacitance type pressure sensor is constructed by using a thickness part of the diaphragm 11 as a conductive film, where a terminal wire 32 extended out from the movable electrode 31 is used as an output terminal. In addition, in the modified example 3, since materials of the pressure-receiving substrate 10 and the opposing substrate 20 are the same, it is unnecessary to consider substrate warpage and influence of residual stress during anodic bonding. Thus, it employs a manner of arranging no slit.

As in the modified example, the conductive film of the invention may be arranged on either the pressure-receiving substrate or the opposing substrate. In addition, without using a through-hole and a castellation, it is possible to form the conductive wire (output terminal) in the manner as described above.

The invention is not limited to the above-described embodiment.

For example, as the pressure-receiving substrate, other than crystal or glass, silicon, ceramic or the like may be used.

In addition, the movable electrode on the diaphragm may be, as in the pressure sensor according to Patent Literature 1, formed in a manner in which an impurity is doped into a diaphragm region formed on a silicon substrate.

In addition, the invention may be applicable to a capacitance pressure sensor of a type (which is not of a touch mode), in which the movable electrode and the dielectric film are not in contact.

In addition, each structure of each embodiment may be combined with each other as appropriate, may be omitted, or may be combined with other structures which have not been shown in the figures.

The entire disclosure of Japanese Patent Application No. 2005-242245 filed Aug. 24, 2005, is expressly incorporated by reference therein.

What is claimed is:

1. A pressure sensor comprising:
   a substrate having a movable electrode formed on a diaphragm; and another substrate having an opposing electrode opposing the movable electrode, the substrates being bonded together at respective opposing surfaces via a conductive film, wherein
   the conductive film includes a conductive wire extending from one of the movable electrode and the opposing electrode and is formed in a pattern capable of sealing a predetermined region on the opposing surface side of the diaphragm as a pressure reference chamber;
   a lead wire extends from one of the movable electrode and the opposing electrode, the lead wire contacting the conductive film at a contact point; and
   at least one of the substrates including a thin-walled portion adjacent the contact point, the thin-walled portion being thinner than a surrounding area of the at least one of the substrates.

2. The pressure sensor as described in claim 1, wherein at least a part of the conductive film is formed facing an outer edge of one of the substrates.

3. The pressure sensor as described in claim 1, wherein at least a part of the conductive film is formed facing a through-hole formed in one of the substrates.

4. The pressure sensor as described in claim 1, wherein a crystal plate is used as the substrate having the diaphragm.

5. The pressure sensor as described in claim 4, wherein a crystal plate cut out by an AT cut is used as the substrate having the diaphragm.

6. A method for manufacturing a pressure sensor, the method comprising:
   forming a substrate having a movable electrode formed on a diaphragm, the substrate including an opposing surface;
   forming a substrate having an opposing electrode for opposing the movable electrode, the substrate including an opposing surface;
   forming a lead wire extending from one of the movable electrode and the opposing electrode;
   forming a conductive film on at least one of the opposing surfaces in a pattern capable of sealing a predetermined region as a pressure reference chamber, the conductive film comprising a conductive wire extending from one of the movable electrode and the opposing electrode; and
   anodically bonding the conductive film formed on the at least one of the opposing surfaces and the opposing surface of the other substrate such that the lead wire contacts the conductive film at a contact point and such that a thin-walled portion included on at least one of the substrates is adjacent the contact point, the thin-walled portion being thinner than a surrounding area of the at least one of the substrates.

7. The pressure sensor of claim 1, wherein at least one of the substrates includes a slit formed inside the pressure reference chamber.

8. The method of claim 6, further comprising forming a slit inside the pressure reference chamber.

* * * * *